United States Patent
Kogure et al.

(10) Patent No.: US 6,783,188 B2
(45) Date of Patent: Aug. 31, 2004

(54) METHOD OF FITTING TIRE-AND-WHEEL ASSEMBLED BODY TO AXLE

(75) Inventors: Tomohiko Kogure, Hiratsuka (JP); Tatsuo Suzuki, Hiratsuka (JP); Shinji Seimiya, Hiratsuka (JP); Eiji Saito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/263,681

(22) Filed: Oct. 4, 2002

(65) Prior Publication Data

US 2003/0067211 A1 Apr. 10, 2003

(30) Foreign Application Priority Data

Oct. 9, 2001 (JP) ........................................ 2001-311373

(51) Int. Cl.[7] ................................................ B60B 27/00
(52) U.S. Cl. ............................ 301/35.627; 301/35.631; 29/404
(58) Field of Search .................. 301/35.627, 35.631, 301/35.632; 29/404, 407, 894.3, 520; 411/537

(56) References Cited

U.S. PATENT DOCUMENTS

| | | | | |
|---|---|---|---|---|
| 3,428,365 A | * | 2/1969 | French | 301/35.631 |
| 3,749,450 A | * | 7/1973 | Senter et al. | 301/35.631 |
| 3,808,660 A | * | 5/1974 | Wik | 29/894.3 |
| 3,857,611 A | * | 12/1974 | Pansky et al. | 301/35.631 |
| 4,898,429 A | * | 2/1990 | Plumer | 301/35.632 |
| 2002/0130548 A1 | * | 9/2002 | Gilley et al. | 301/35.631 |

FOREIGN PATENT DOCUMENTS

JP 56-086805 A1 7/1981

* cited by examiner

*Primary Examiner*—Russell D. Stormer
(74) *Attorney, Agent, or Firm*—Rader, Fishman & Grauer PLLC

(57) ABSTRACT

Provided is a method of fitting a tire-and-wheel assembled body to an axle, which is capable of resolving imbalance in a state of fitting an assembled body including a tire and a wheel to an axle. In this fitting method, a tire is fitted to a wheel, and then core positions of fastening holes are, or a core position of a hub hole is, adjusted in the wheel to minimize an amount of eccentricity of an assembled body including the tire and the wheel.

8 Claims, 8 Drawing Sheets

RRO max.

METHOD OF FITTING TIRE-AND-WHEEL ASSEMBLED BODY TO AXLE

BACKGROUND OF THE INVENTION

The present invention relates to a method of fitting an assembled body including a tire and a wheel to an axle, more specifically, to a method of fitting a tire-and-wheel assembled body to an axle, which is arranged to resolve imbalance in a state of fitting the assembled body including the tire and the wheel to the axle.

Upon fitting (engagement) of a tire and a wheel, dynamic imbalance in a state of assembling these elements has been heretofore suppressed to the minimum by aligning a light spot of the tire with a heavy spot of the wheel or by aligning a position of the maximum primary component of RFV of the tire with a position of minimum runout (RRO) of the wheel.

However, it is difficult to completely cancel out the imbalance potentially possessed by each of the tire and the wheel even if the above-mentioned fitting takes place. Accordingly, the imbalance still exists in the assembled state. For this reason, a weight made of lead is fitted to the wheel to correct the imbalance of the assembled body, and then the assembled body is fitted to a vehicle. Nevertheless, precision upon fitting the assembled body to an axle of the vehicle is not always sufficient. Accordingly, there is also a problem of causing eccentricity in the event of fitting.

SUMMARY OF THE INVENTION

It is an object of the present invention to provide a method of fitting a tire-and-wheel assembled body to an axle, which is capable of resolving imbalance in a state of fitting the assembled body including a tire and a wheel to the axle.

To attain the foregoing object, the present invention provides a method of fitting a tire-and-wheel assembled body to an axle, in which a tire is fitted to a wheel including a plurality of fastening holes for allowing insertion of bolts of a car body portion, the fastening holes being arranged so as to effectuate free displacement of cores, and then core positions of the fastening holes are adjusted to minimize an amount of eccentricity of the assembled body including the tire and the wheel.

In this way, the wheel including the fastening holes arranged to effectuate free displacement of the cores is used and the core positions of the fastening holes are adjusted such that the amount of eccentricity of the assembled body including the tire and the wheel is set to the minimum. Accordingly, it is possible to resolve imbalance in the state where the assembled body including the tire and the wheel is fitted to an axle. In this case, it is preferred to measure runout of the assembled body around a standard rotation axis of the wheel and to displace all the cores of the fastening holes in the same direction as a direction from the standard rotation axis to a peak position of the runout.

As means for adjusting the core positions of the fastening holes, it is possible to insert an eccentric collar into the fastening hole, to insert a shim into the fastening hole, or to provide the fastening hole with an adjustive screw mechanism which can freely approach and recede relevant to a bolt shaft.

Moreover, to attain the foregoing object, the present invention provides a method of fitting a tire-and-wheel assembled body to an axle, in which a tire is fitted to a wheel including a hub hole arranged so as to effectuate free displacement of a core thereof, and then a core position of the hub hole is adjusted to minimize an amount of eccentricity of the assembled body including the tire and the wheel.

In this way, the wheel including the hub hole arranged to effectuate free displacement of the core is used and the core position of the hub hole is adjusted such that the amount of eccentricity of the assembled body including the tire and the wheel is set to the minimum. Accordingly, it is possible to resolve imbalance in the state where the assembled body including the tire and the wheel is fitted to the axle. In this case, it is preferred to measure runout of the assembled body around a standard rotation axis of the wheel and to displace the core of the hub hole from the standard rotation axis toward a peak position of the runout.

As means for adjusting the core position of the hub hole, it is possible to insert an eccentric collar into the hub hole, to insert a shim into the hub hole, or to provide the hub hole with an adjustive screw mechanism which can freely approach and recede relevant to a hub shaft.

Furthermore, to attain the foregoing object, the present invention provides a method of fitting a tire-and-wheel assembled body to an axle, in which a tire is fitted to a wheel including a preprocessed hub hole, and then the hub hole is reprocessed to minimize an amount of eccentricity of the assembled body including the tire and the wheel.

In this way, the wheel including the preprocessed hub hole is used and the hub hole is reprocessed such that the amount of eccentricity of the assembled body including the tire and the wheel is set to the minimum. Accordingly, it is possible to resolve imbalance in the state where the assembled body including the tire and the wheel is fitted to the axle. In this case, it is preferred to measure runout of the assembled body around a standard rotation axis of the wheel and to reprocess the hub hole while setting a position corrected from the standard rotation axis toward a peak position of the runout as a core position.

Furthermore, to attain the foregoing object, the present invention provides a method of fitting a tire-and-wheel assembled body to an axle, in which a tire is fitted to a wheel including a hub hole, and then a plurality of fastening holes are processed around the hub hole to minimize an amount of eccentricity of the assembled body including the tire and the wheel.

In this way, the wheel including the hub hole is used and the plurality of fastening holes are processed around the hub hole such that the amount of eccentricity of the assembled body including the tire and the wheel is set to the minimum. Accordingly, it is possible to resolve imbalance in the state where the assembled body including the tire and the wheel is fitted to the axle. In this case, it is preferred to measure runout of the assembled body around a standard rotation axis of the wheel and to process the fastening holes while setting a position corrected in the same direction as a direction from the standard rotation axis to a peak position of the runout as a core position.

Furthermore, to attain the foregoing object, the present invention provides a method of fitting a tire-and-wheel assembled body to an axle, in which a tire is fitted to a wheel including a preprocessed hub hole, and then the hub hole is reprocessed and a plurality of fastening holes are processed around the hub hole to minimize an amount of eccentricity of the assembled body including the tire and the wheel.

In this way, the wheel including the preprocessed hub hole is used, and the hub hole is reprocessed and the plurality of fastening holes are processed around the hub hole such that the amount of eccentricity of the assembled body including the tire and the wheel is set to the minimum. Accordingly, it is possible to resolve imbalance in the state where the assembled body including the tire and the wheel is fitted to the axle.

BRIEF DESCRIPTION OF THE DRAWINGS

FIG. 6(a) and FIG. 6(b) schematically show principal part of a wheel in the first method of fitting a tire-and-wheel assembled body to an axle, in which FIG. 6(a) is a schematic plan view in the event of measuring runout and FIG. 6(b) is a schematic plan view after adjusting core positions of fastening holes.

FIG. 10(a) and FIG. 10(b) schematically show principal part of a wheel in the second method of fitting a tire-and-wheel assembled body to an axle, in which FIG. 10(a) is a schematic plan view in the event of measuring runout and FIG. 10(b) is a schematic plan view after adjusting a core position of a hub hole.

FIG. 11(a) and FIG. 11(b) schematically show principal part of a wheel in a third method of fitting a tire-and-wheel assembled body to an axle, in which FIG. 11(a) is a schematic plan view in the event of measuring runout and FIG. 11(b) is a schematic plan view after reprocessing a hub hole.

FIG. 12(a) and FIG. 12(b) schematically show principal part of a wheel in a fourth method of fitting a tire-and-wheel assembled body to an axle, in which FIG. 12(a) is a schematic plan view in the event of measuring runout and FIG. 12(b) is a schematic plan view after processing fastening holes.

DETAILED DESCRIPTION OF THE PREFERRED EMBODIMENTS

Now, a constitution of the present invention will be described in detail with reference to the accompanying drawings.

Figure 1:
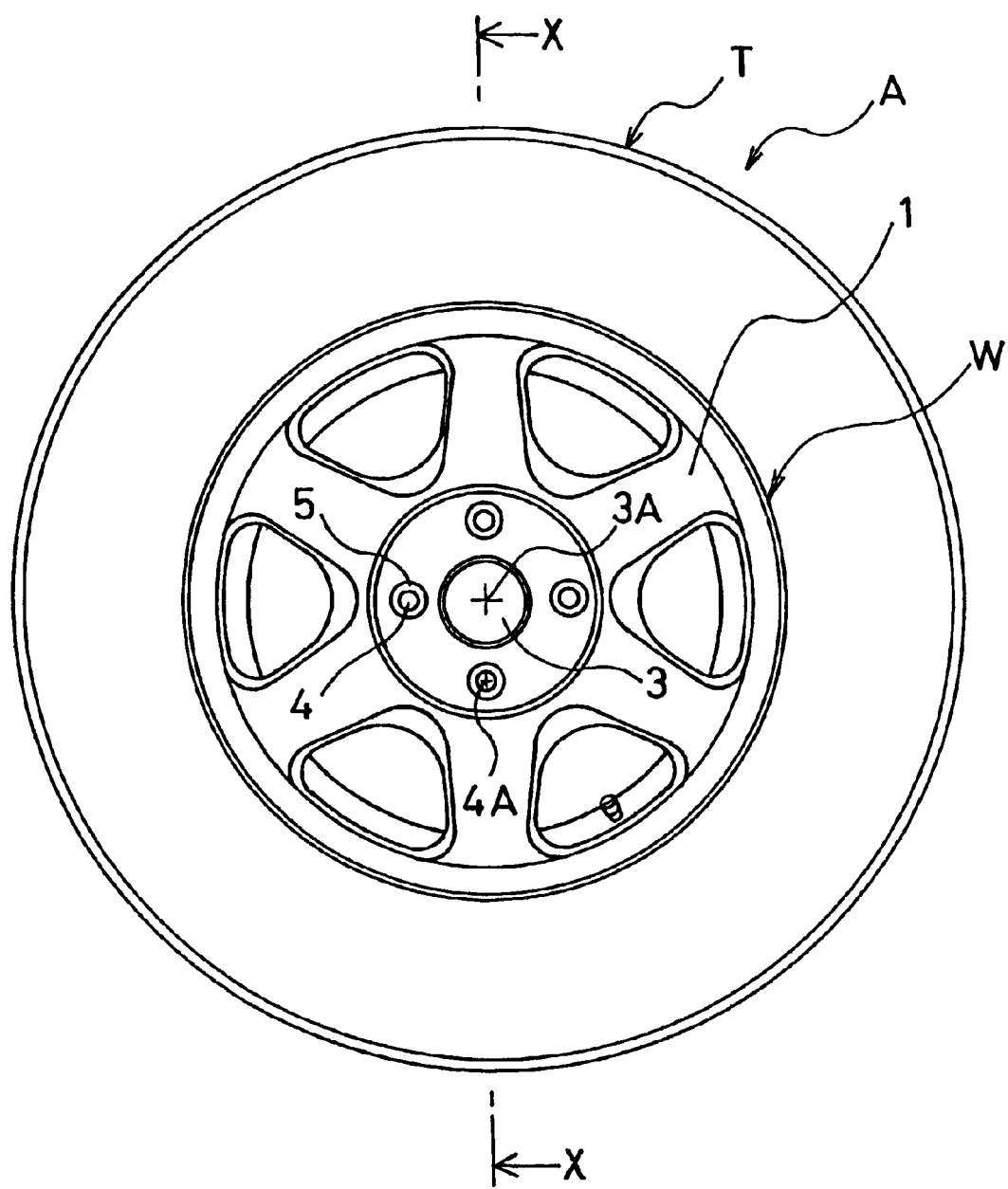
FIG. 1 is a side view exemplifying a tire-and-wheel assembled body in order to explain a method of fitting a tire-and-wheel assembled body to an axle according to the present invention.
Figure 2:
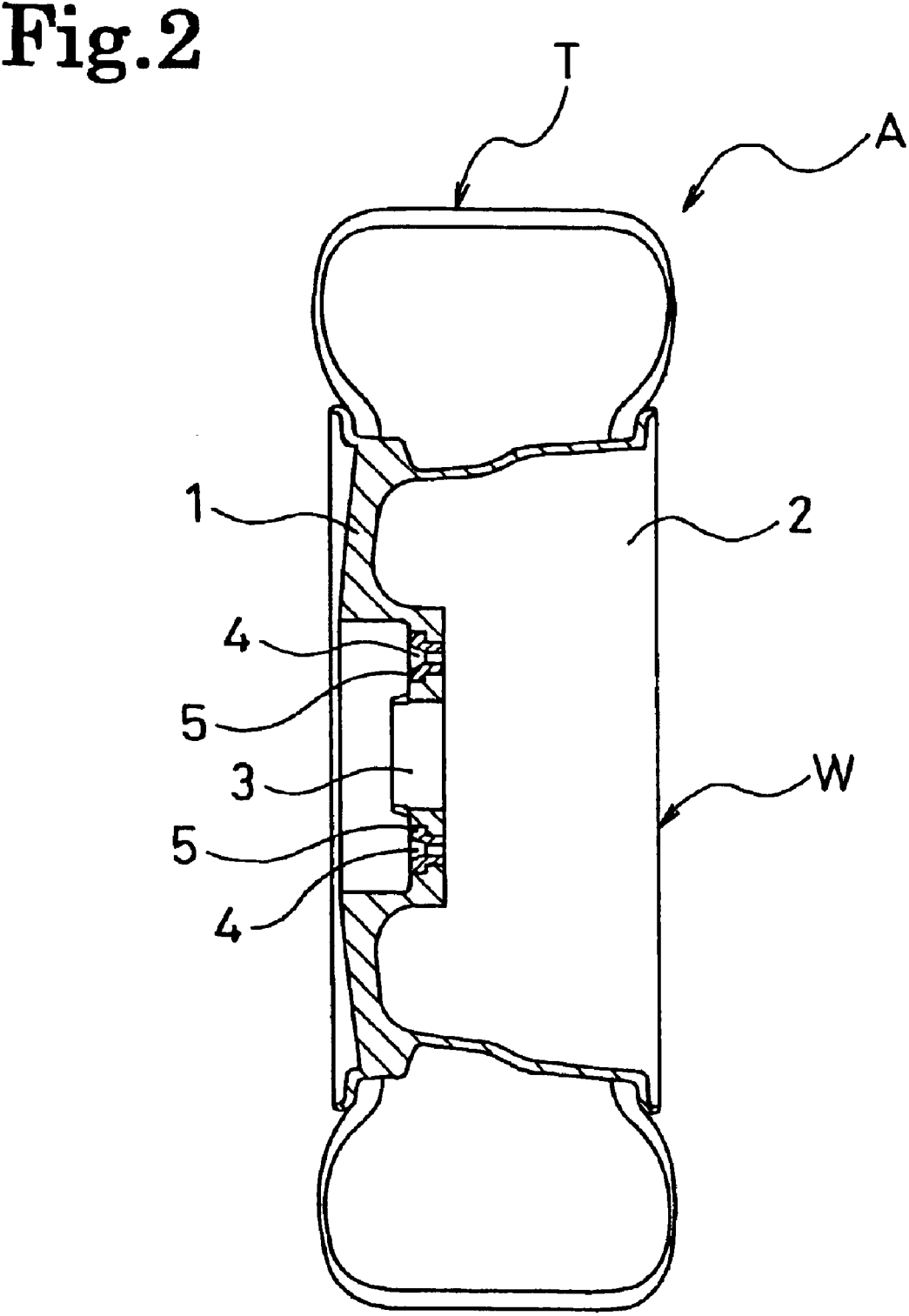
FIG. 2 is a cross-sectional view taken along the X—X line in FIG. 1.

FIG. 1 shows a basic constitution of a tire-and-wheel assembled body, and FIG. 2 is a cross-sectional view taken along the X—X line thereof. In FIG. 1, a wheel W includes a disk portion 1 of a discoid shape, and a rim portion 2 abutting on the disk portion 1. In the center of the disk portion 1, there is formed a hub hole 3 for allowing a hub shaft of a car body portion (an axle hub) to be inserted thereinto. In the periphery of the hub hole 3, there are formed a plurality of fastening holes 4 for allowing bolts of the car body portion to be inserted thereinto. A collar 5 for defining a core position 4A is put in each of the fastening holes 4. An assembled body A is formed by setting a tire T onto the rim portion 2 of this wheel W.

According to a first method of fitting a tire-and-wheel assembled body to an axle, the wheel including the plurality of fastening holes 4 arranged to effectuate free displacement of the cores is used and the core positions 4A of the fastening holes 4 are adjusted so as to minimize an amount of eccentricity of the assembled body A including the tire T and the wheel W.

Figure 3A:
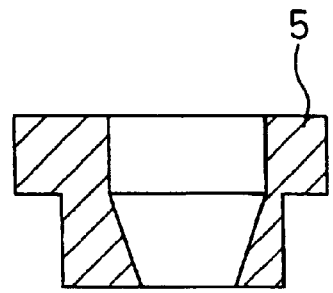
FIG. 3(a) is a cross-sectional view and FIG. 3(b) is a plan view for showing a collar for use in a first method of fitting a tire-and-wheel assembled body to an axle.
Figure 3B:
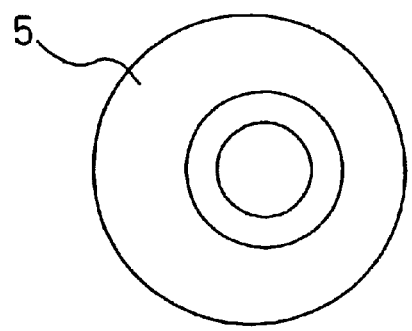
Figure 4A:
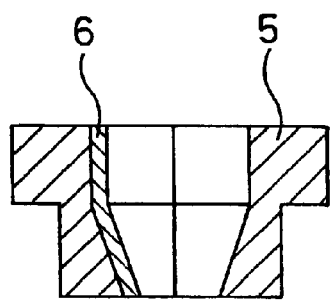
FIG. 4(a) is a cross-sectional view and FIG. 4(b) is a plan view for showing the collar and a shim for use in the first method of fitting a tire-and-wheel assembled body to an axle.
Figure 4B:
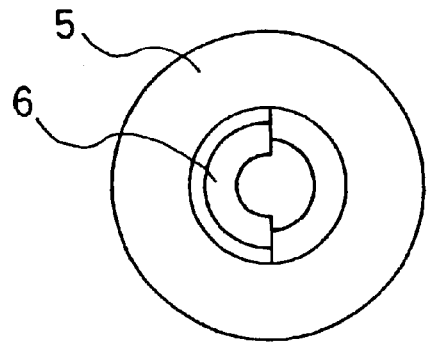
Figure 5A:
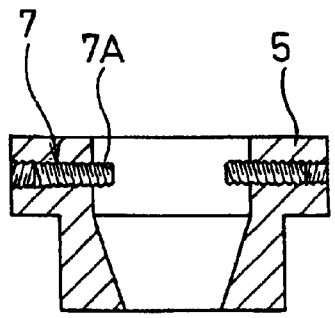
FIG. 5(a) is a cross-sectional view and FIG. 5(b) is a plan view for showing another collar provided with an adjustive screw mechanism for use in the first method of fitting a tire-and-wheel assembled body to an axle.
Figure 5B:
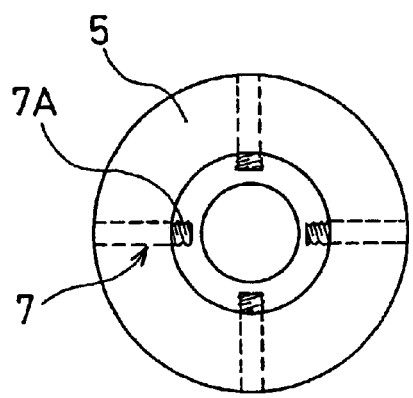

Constitutions as illustrated in FIG. 3(a) to FIG. 5(b) can be cited as means for adjusting the core positions 4A of the fastening holes 4. In FIG. 3(a) and FIG. 3(b), the collar 5 to be inserted into the fastening hole 4 is designed as eccentric. Accordingly, it is possible to adjust the core position 4A by rotating the collar 5 inside the fastening hole 4. In this case, it is preferred to prepare several types of collars 5 with different amounts of eccentricity. In FIG. 4(a) and FIG. 4(b), a shim (a wedge) 6 is inserted into the collar 5. Accordingly, it is possible to adjust the core position 4A by changing a position of the shim 6 inside the collar 5. If the collar 5 is not provided, then the shim 6 may be inserted directly into the fastening hole 4. In FIG. 5(a) and FIG. 5(b), the collar 5 is provided with an adjustive screw mechanism 7 which can freely approach and recede relevant to a bolt shaft. This adjustive screw mechanism 7 has a constitution of putting screws 7A severally into a plurality of screw holes formed on the collar 5. Accordingly, it is possible to adjust the core position 4A by mutually changing amounts of protrusions of these screws 7A. If the collar 5 is not provided, then the adjustive screw mechanism 7 may be formed directly on the fastening hole 4.

Figure 6A:
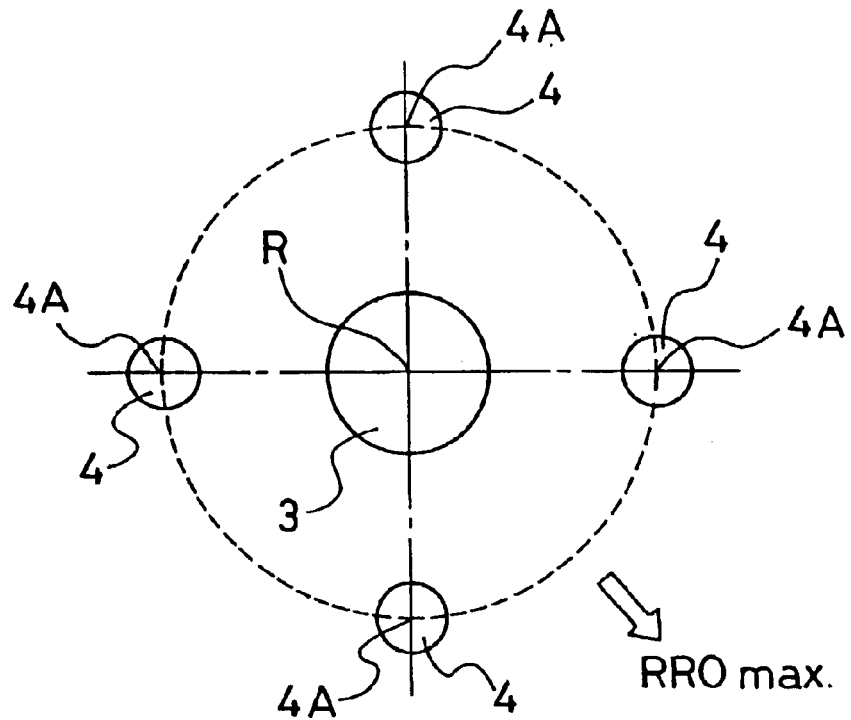
Figure 6B:
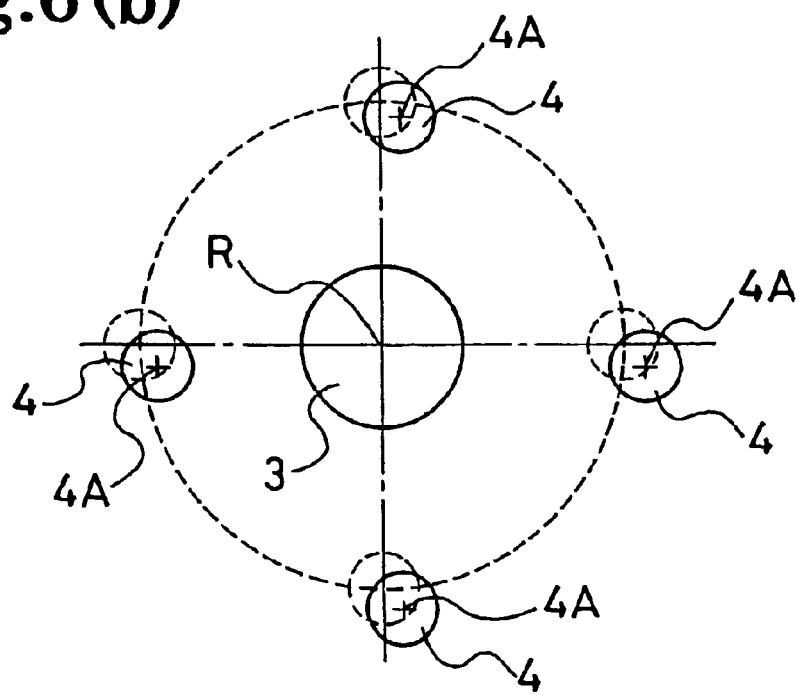

To minimize an amount of eccentricity of the assembled body A, as shown in FIG. 6(a), runout of the assembled body A is measured around a standard rotation axis R of the wheel W, and then all the cores of the fastening holes 4 are displaced in the same direction as a direction from the standard rotation axis R toward a position where a peak ($RRO_{max}$) of the runout is located. In other words, whereas the core positions 4A of the fastening holes 4 are normally located in equivalently distant positions from the standard rotation axis R of the wheel W, the core positions 4A are displaced from the original positions in a certain direction as shown in FIG. 6(b). The amount of eccentricity of the fastening hole 4 can be calculated based on a primary peak of the runout. Meanwhile, the hub hole 3 may be formed in a size so as not to restrict centering of the hub shaft.

The wheel W including the fastening holes 4 arranged to effectuate free displacement of the cores is used as described above, and the core positions 4A of the fastening holes 4 are adjusted so as to minimize the amount of eccentricity of the assembled body A. Accordingly, it is possible to resolve imbalance in a state of fitting the assembled body A including the tire T and the wheel W to the axle. As a result, it is possible to reduce or eliminate balance weights made of lead or iron, which have been conventionally used. Upon changing the tire, it is possible to conduct readjustment or to install balance weights as in the past.

According to a second method of fitting a tire-and-wheel assembled body to an axle, a wheel including a hub hole 3 arranged to effectuate free displacement of a core is used, and a core position 3A of the hub hole 3 is adjusted so as to minimize an amount of eccentricity of an assembled body A including a tire T and the wheel W.

Figure 7A:
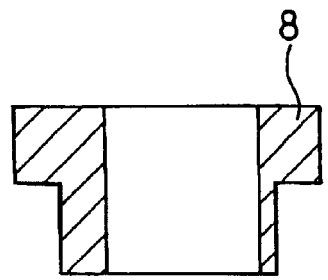
FIG. 7(a) is a cross-sectional view and FIG. 7(b) is a plan view for showing a collar for use in a second method of fitting a tire-and-wheel assembled body to an axle.
Figure 7B:
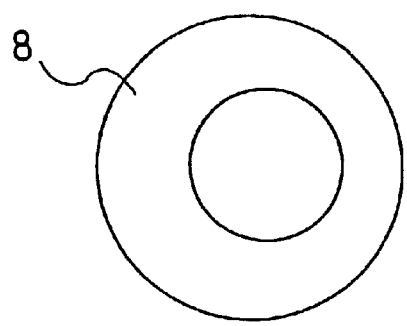
Figure 8A:
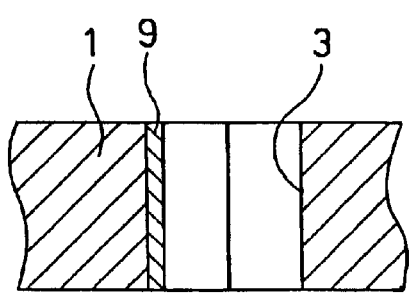
FIG. 8(a) is a cross-sectional view and FIG. 8(b) is a plan view for showing a shim for use in the second method of fitting a tire-and-wheel assembled body to an axle.
Figure 8B:
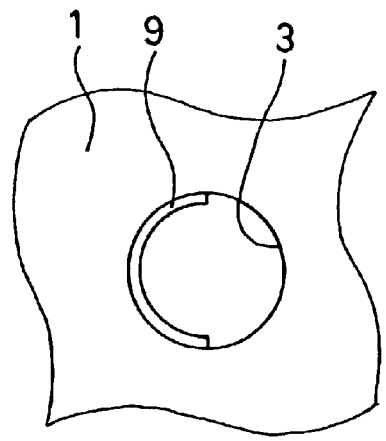
Figure 9A:
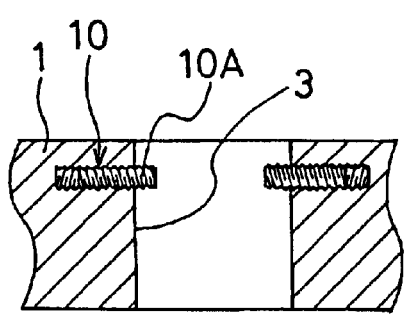
FIG. 9(a) is a cross-sectional view and FIG. 9(b) is a plan view for showing an adjustive screw mechanism for use in the second method of fitting a tire-and-wheel assembled body to an axle.
Figure 9B:
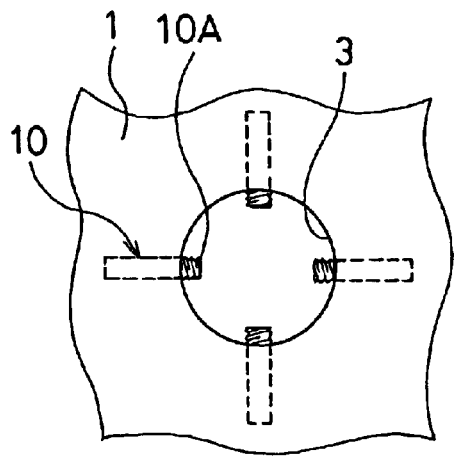

Constitutions as illustrated in FIG. 7(a) to FIG. 9(b) can be cited as means for adjusting the core position 3A of the hub hole 3. In FIG. 7(a) and FIG. 7(b), an eccentric collar 8 is inserted into the hub hole 3. Accordingly, it is possible to adjust the core position 3A by rotating the collar 8 inside the hub hole 3. In this case, it is preferred to prepare several types of collars 8 with different amounts of eccentricity. In FIG. 8(a) and FIG. 8(b), a shim (a wedge) 9 is inserted into the hub hole 3. Accordingly, it is possible to adjust the core position 3A by changing a position of the shim 9 inside the hub hole 3. In FIG. 9(a) and FIG. 9(b), the hub hole 3 is provided with an adjustive screw mechanism 10 which can freely approach and recede relevant to a hub shaft. This adjustive screw mechanism 10 has a constitution of putting screws 10A severally into a plurality of screw holes formed on the hub hole 3. Accordingly, it is possible to adjust the core position 3A by mutually changing amounts of protrusions of these, screws 10A.

Figure 10A:
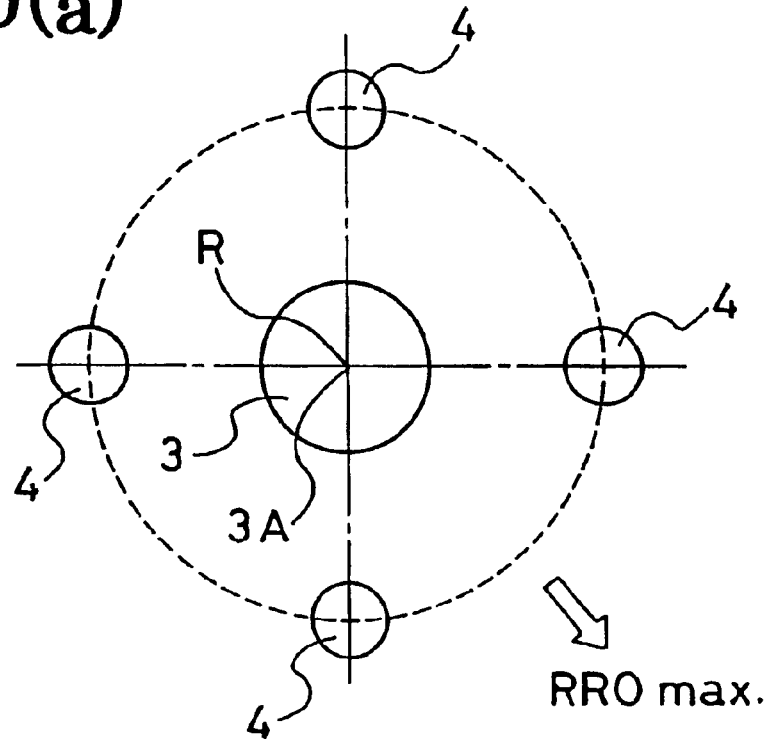
Figure 10B:
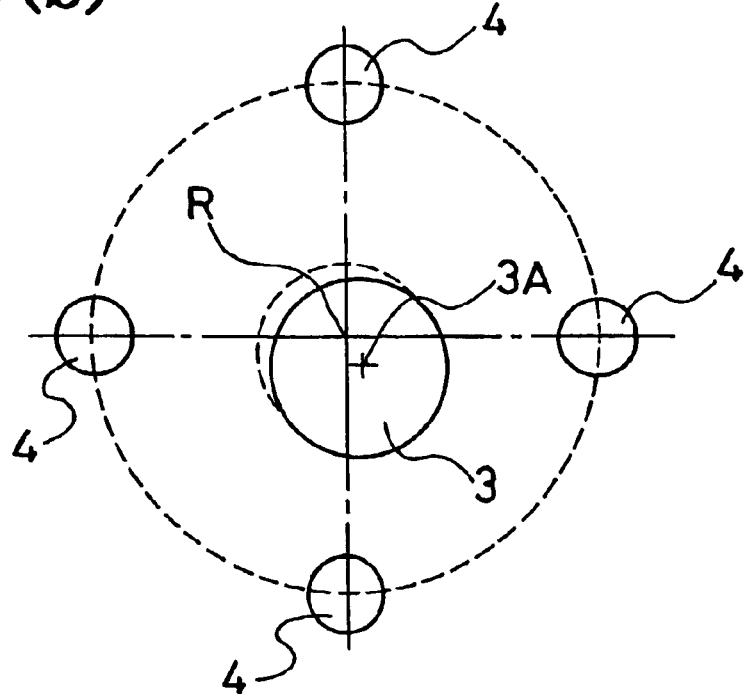

To minimize an amount of eccentricity of the assembled body A, as shown in FIG. 10(a), runout of the assembled body A is measured around a standard rotation axis R of the wheel W, and then the cores of the hub hole 3 is displaced from the standard rotation axis R toward a position where a peak ($RRO_{max}$) of the runout is located. In other words, whereas the core position 3A of the hub hole 3 normally coincides with the standard rotation axis R of the wheel W, the core position 3A is displaced from the original position in a certain direction as shown in FIG. 10(b). The amount of eccentricity of the hub hole 3 can be calculated based on a primary peak of the runout. Meanwhile, each fastening hole 4 may be formed in a size so as not to restrict centering of a bolt shaft.

The wheel W including the hub hole 3 arranged to effectuate free displacement of the core is used as described above, and the core position 3A of the hub hole 3 is adjusted so as to minimize the amount of eccentricity of the assembled body A. Accordingly, it is possible to resolve imbalance in a state of fitting the assembled body A including the tire T and the wheel W to the axle. As a result, it is possible to reduce or eliminate balance weights made of lead or iron, which have been conventionally used. Upon changing the tire, it is possible to conduct readjustment or to install balance weights as in the past.

According to a third method of fitting a tire-and-wheel assembled body to an axle, a wheel including a preprocessed hub hole 3 is used, and the hub hole 3 is reprocessed so as to minimize an amount of eccentricity of an assembled body A including a tire T and the wheel W.

Figure 11A:
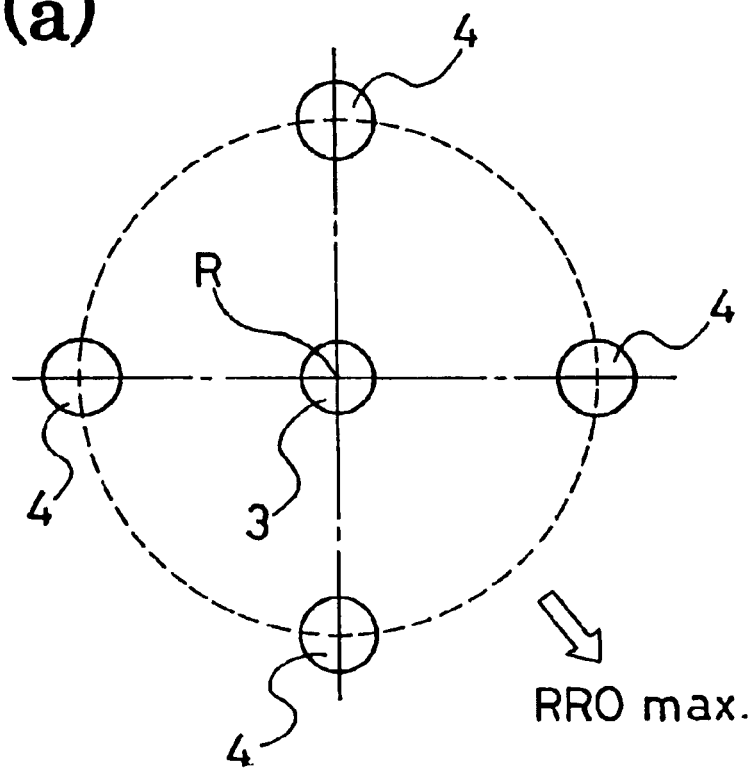
Figure 11B:
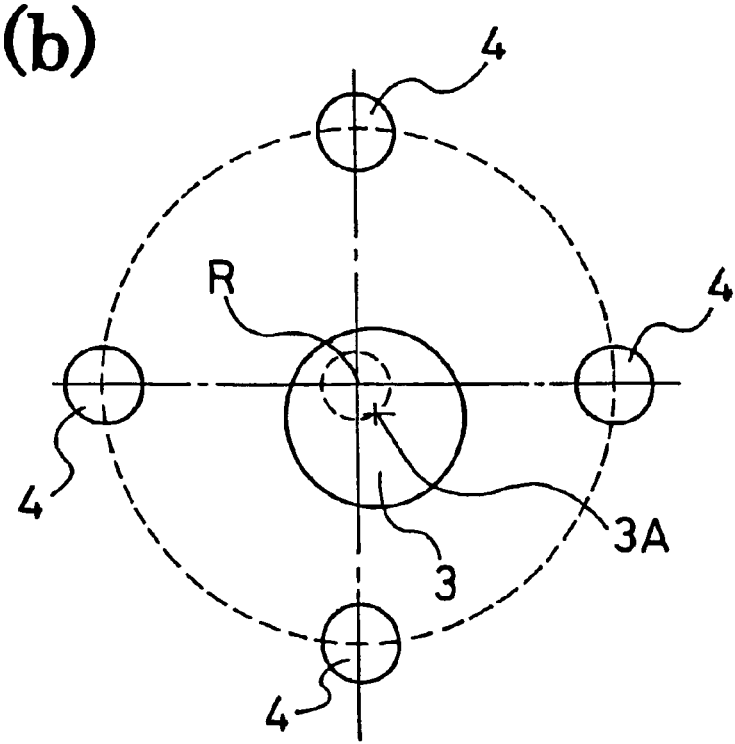

Specifically, runout of the assembled body A is measured around a standard rotation axis R of the wheel W as shown in FIG. 11(a), and then the hub hole 3 is reprocessed while setting a position corrected from the standard rotation axis R toward a position where a peak ($RRO_{max}$) of the runout is located as a core position 3A as shown in FIG. 11(b). Note that a dimension upon preprocessing is set up sufficiently smaller than a dimension upon reprocessing. In this way, the preprocessed hole completely vanishes in the event of reprocessing. The amount of eccentricity of the hub hole 3 can be calculated based on a primary peak of the runout. Meanwhile, each fastening hole 4 may be formed in a size so as not to restrict centering of a bolt shaft.

The wheel W including the preprocessed hub hole 3 is used as described above, and the hub hole 3 is reprocessed so as to minimize the amount of eccentricity of the assembled body A. Accordingly, it is possible to resolve imbalance in a state of fitting the assembled body A including the tire T and the wheel W to the axle. As a result, it is possible to reduce or eliminate balance weights made of lead or iron, which have been conventionally used. Upon changing the tire, it is possible to conduct readjustment or to install balance weights as in the past.

According to a fourth method of fitting a tire-and-wheel assembled body to an axle, a wheel including a normal hub hole 3 is used, and a plurality of fastening holes 4 are processed around the hub hole 3 so as to minimize an amount of eccentricity of an assembled body A including a tire T and the wheel W.

Figure 12A:
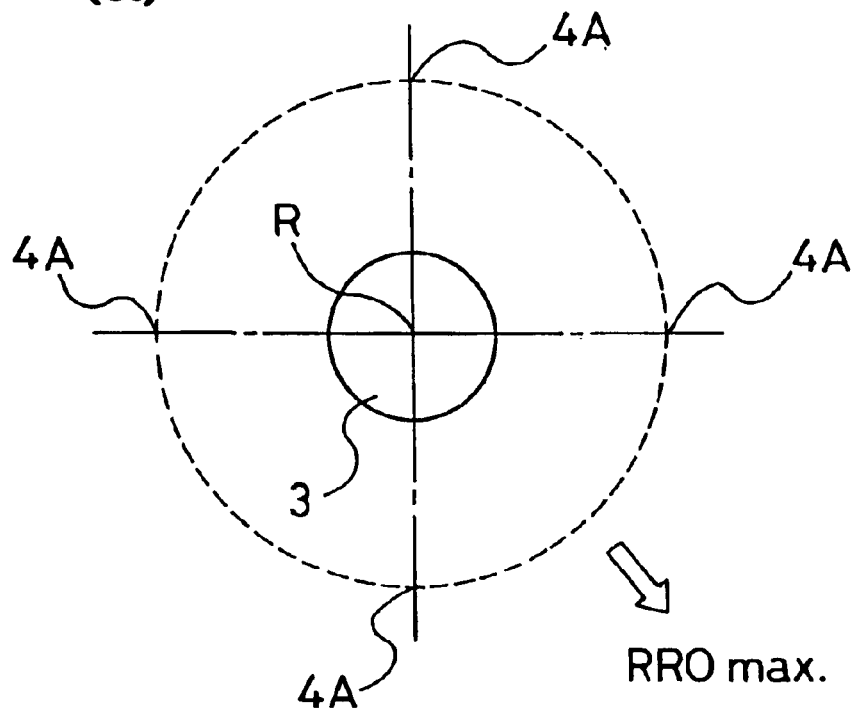
Figure 12B:
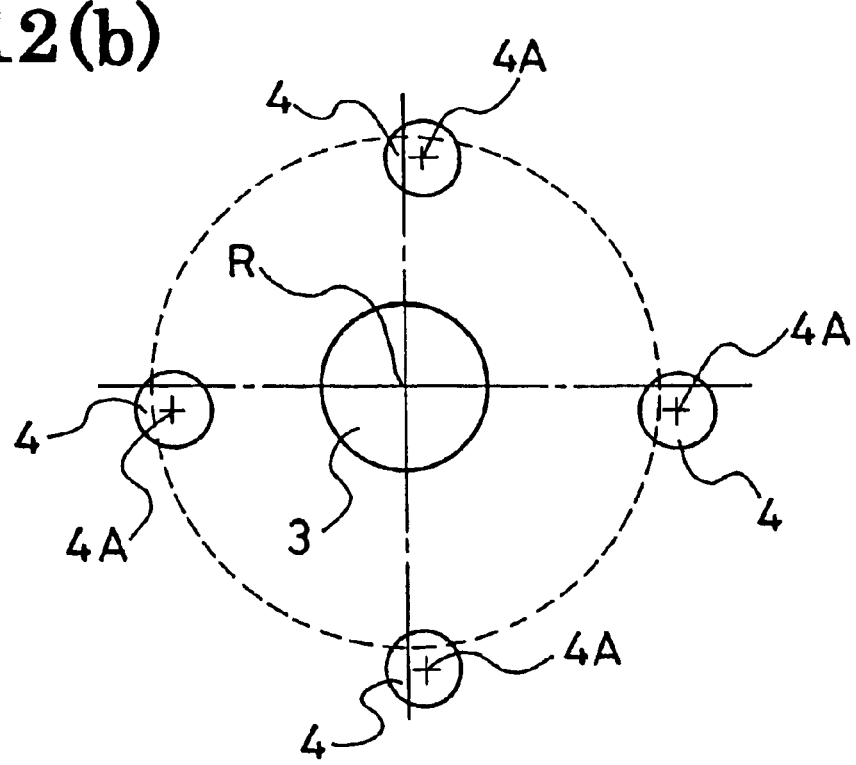

Specifically, runout of the assembled body A is measured around a standard rotation axis R of the wheel W as shown in FIG. 12(a), and then the fastening holes 4 are processed while setting positions corrected in the same direction as a direction from the standard rotation axis R toward a position where a peak ($RRO_{max}$) of the runout is located as core positions 4A as shown in FIG. 12(b). Although these fastening holes 4 are displaced from positions equivalently distant from the hub hole 3, relative collocations thereof may be set as in the past. These fastening holes 4 may be preprocessed in advance. In that case, a dimension upon preprocessing is set up sufficiently smaller than a dimension upon reprocessing. In this way, the preprocessed hole completely vanishes in the event of reprocessing. The amount of eccentricity of the fastening hole 4 can be calculated based on a primary peak of the runout. Meanwhile, the hub hole 3 may be formed in a size so as not to restrict centering of a hub shaft.

The wheel W including the hub hole 3 is used as described above, and the plurality of fastening holes 4 are processed around the hub hole 3 so as to minimize the amount of eccentricity of the assembled body A. Accordingly, it is possible to resolve imbalance in a state of fitting the assembled body A including the tire T and the wheel W to the axle. As a result, it is possible to reduce or eliminate balance weights made of lead or iron, which have been conventionally used. Upon changing the tire, it is possible to conduct readjustment or to install balance weights as in the past.

Moreover, it is possible to adopt the third and fourth methods of fitting a tire-and-wheel assembled body to an axle in combination. Specifically, it is possible to use a wheel including a preprocessed hub hole 3, and to reprocess the hub hole 3 so as to minimize an amount of eccentricity of an assembled body A including a tire T and the wheel W as well as to process a plurality of fastening holes 4 around the hub hole 3.

In the present invention, an amount of adjustment of a core position is preferably set in a range from 0.05 to 1.0 mm, or more preferably in a range from 0.05 to 0.3 mm. An effect of adjustment is inadequate if the amount of adjustment is below 0.05 mm. On the contrary, if the amount of adjustment exceeds 1.0 mm, there is a risk in the case of changing the tire by means of installing balance weights that the new tire may require more balance weights than a conventional case depending on the combination.

As described above, according to the present invention, in order to minimize an amount of eccentricity of an assembled body including a tire and a wheel, core positions of fastening holes are, or a core position of a hub hole is, adjusted in the wheel. Accordingly, it is possible to resolve imbalance in a state of fitting the assembled body including the tire and the wheel to an axle, and also to reduce or eliminate weights made of lead that are undesirable for the environment. In particular, the present invention can achieve remarkable operational effects when applied to genuine parts of an automotive manufacturer because the types of the tire and the wheel are specified.

Although the present invention has been described in detail with reference to certain preferred embodiments, it should be understood that various modifications, substitutions and alterations can be made therein without departing from the spirit and scope of the present invention as defined by the appended claims.

What is claimed is:

1. A method of fitting a tire-and-wheel to assembled body to an axle to form an assembled body so that an amount of eccentricity of the assembled body can be minimized, the method comprising the steps of:

fitting a tire to a wheel to form the tire-and-wheel assembly body;

measuring runout of the assembled body around a standard rotational axis of the wheel to establish a peak position of the runout;

determining normal core positions of first fastening holes around the rotational axis of the wheel, the normal core positions being disposed at a predetermined radius from the rotational axis with sequential ones of the normal core positions being angularly disposed apart equidistantly from one another at a predetermined angle;

forming second fastening holes with associated second core positions into the wheel, the second core positions being displaced relative to respective ones of the normal core positions in a same direction as the direction of the peak position runout; and mounting the tire-and-wheel assembly body to the axle.

2. The method of fitting a tire-and-wheel assembled body to an axle according to claim 1, wherein an eccentric collar is inserted into the fastening hole as means for adjusting the core position of the fastening hole.

3. The method of fitting a tire-and-wheel assembled body to an axle according to claim 1, wherein a shim is inserted into the fastening hole as means for adjusting the core position of the fastening hole.

4. The method of filling a tire-and-wheel assembled body to an axle according to claim 1, wherein the fastening hole is provided with an adjustive screw mechanism capable of freely approaching and receding relevant to a bolt shaft as means for adjusting the core position of the fastening hole.

5. A method of fitting a tire-and-wheel assembled body to an axle to form an assembled body so that an amount of eccentricity of the assembled body can be minimized, the method comprising the steps of:

fitting a tire to a wheel to form the tire-and-wheel assembled body;

measuring runout of the assembled body around a standard rotational axis of the wheel to establish a peak position of the runout;

determining a normal core position of a first hub hole around the rotational axis of the wheel, the normal core position coinciding with the rotational axis of the wheel;

forming a second hub hole with a second core position into the wheel, the second core position being displaced relative to the normal core position in a same direction as the direction of the peak position runout; and mounting the tire-and-wheel assembly body to the axle.

6. The method of fitting a tire-and-wheel assembled body to an axle according to claim 5, wherein an eccentric collar is inserted into the hub hole as means for adjusting the core position of the hub hole.

7. The method of fitting a tire-and-wheel assembled body to an axle according to claim 6, wherein a shim is inserted into the hub hole as means for adjusting the core position of the hub hole.

8. The method of fitting a tire-and-wheel assembled body to an axle according to claim 6, wherein the hub hole is provided with an adjustive screw mechanism capable of freely approaching and receding relevant to a hub shaft as means for adjusting the core position of the hub hole.

* * * * *